July 3, 1956 — M. B. RIGGS — 2,752,996
APPARATUS FOR CUTTING TIRE TREADS
Filed Jan. 22, 1954 — 3 Sheets-Sheet 1

INVENTOR.
MART B. RIGGS
BY
R. L. Miller
ATTORNEY

July 3, 1956 M. B. RIGGS 2,752,996
APPARATUS FOR CUTTING TIRE TREADS
Filed Jan. 22, 1954 3 Sheets-Sheet 2
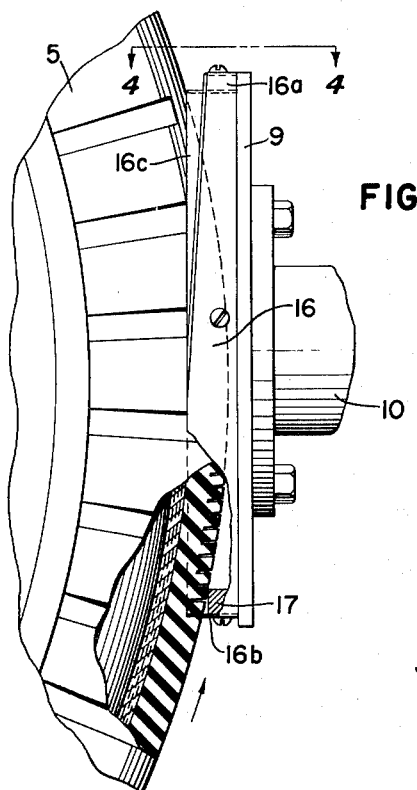
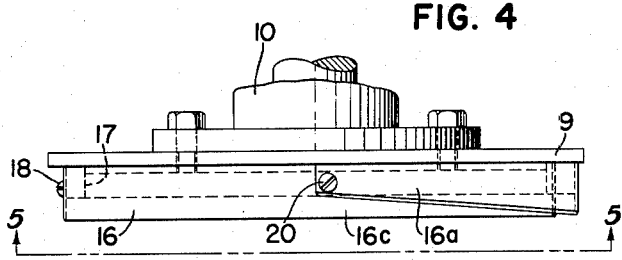
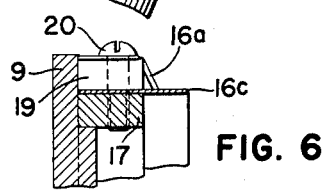
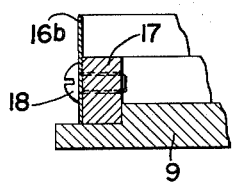
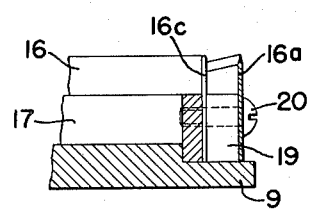
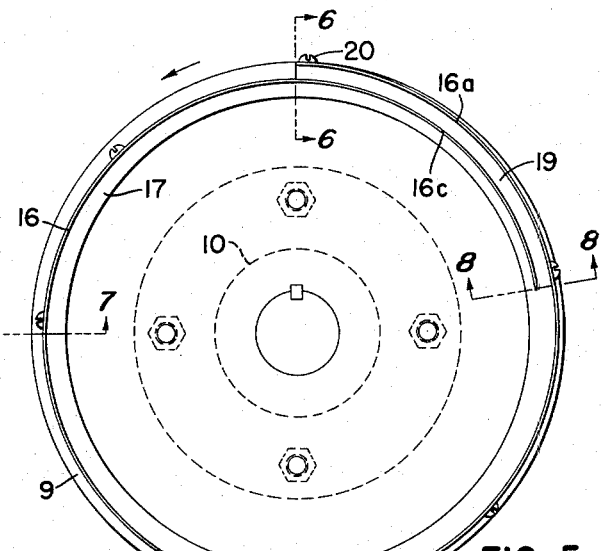
*INVENTOR.*
MART B. RIGGS
BY
R. L. Miller
ATTORNEY July 3, 1956  M. B. RIGGS  2,752,996
APPARATUS FOR CUTTING TIRE TREADS
Filed Jan. 22, 1954  3 Sheets-Sheet 3

*INVENTOR.*
MART B. RIGGS
BY
*R.L. Miller*
ATTORNEY

# United States Patent Office 2,752,996
Patented July 3, 1956

2,752,996

APPARATUS FOR CUTTING TIRE TREADS

Mart B. Riggs, Akron, Ohio, assignor to The Goodyear Tire & Rubber Company, Akron, Ohio, a corporation of Ohio Application January 22, 1954, Serial No. 405,611

7 Claims. (Cl. 164—10.2)

This invention relates to an apparatus for treating tire treads, and more particularly it relates to an apparatus for slitting tire treads transversely for the purpose of improving the anti-skid properties of the tread.

Many devices are known for applying slits to treads all of which necessarily have means for imparting increments of rotation to the tire as the cutter is translated across the face of the tread. The mechanisms necessary to impart the rotation to the tire and to translate the cutter across the surface of the tread are very intricate in design. Applicant has discovered a method and apparatus for automatically imparting increments of rotation to the tire by means which utilizes the slits as they are cut and which inherently eliminates the necessity of translating the cutter shaft relative to the tire tread.

An object of this invention is to provide an economical and automatic device for slitting tires including means for forming arcuate transversely extending slits.

A further object is to provide an apparatus for slitting tire treads with simplified and automatic means for imparting increments of rotation to the tire between each slitting operation and which is easily adaptable to slit tires of various sizes.

The present invention is illustrated in the accompanying drawings in which:

Fig. 3 is an enlarged side elevation of the cutter and mount, with parts broken away to show the slits in section;

Fig. 4 is a side view of the cutter and mount taken along the lines 4—4 of Fig. 3;

Fig. 5 is a plan view of the cutter and mount taken along the lines 5—5 of Fig. 4;

Figure 9:
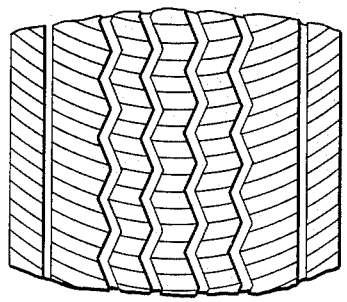
Figure 10:
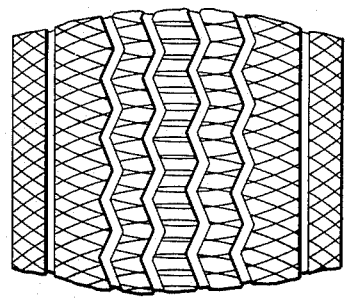
Figure 11:
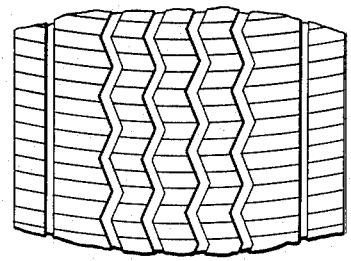
Figure 12:
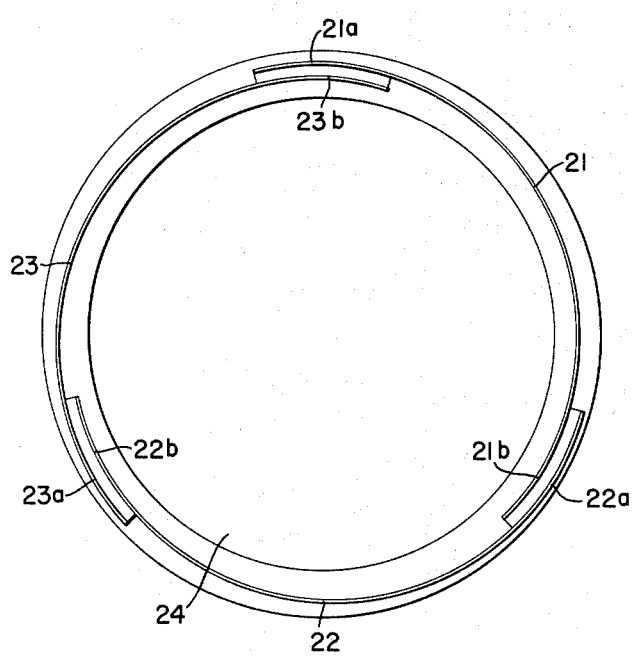

Figs. 6, 7 and 8 are cross sections through the cutter and mount taken along the lines 6—6, 7—7 and 8—8 respectively of Fig. 5;

Figs. 9, 10 and 11 are plan views of tire treads showing types of slitting which may be performed by the apparatus of this invention;

Fig. 12 is a modification of the cutter of this invention showing a plurality of slitting cutters.

Referring to the drawings, the apparatus consists of a frame 1 supporting a stud shaft 2 having a hub 3 to which is mounted wheel 4 and the pneumatic tire 5. The shaft 2 is freely rotatable in bearings 6 and may be axially adjusted by manually positioning the set rings 7 which are adjustably locked to the shaft 2 by means of set screws 8. Cutter mount 9 is rigidly connected to shaft 10 which is driven by motor 11 through the speed reduction unit 12. The shaft 10 is rotatable about an axis parallel to a radius of the tire 5 but it is displaced from that radius or, otherwise stated, the axis of shaft 10 is disposed at an angle to the radius of the tire passing through the slit being cut, as shown in Fig. 3. The motor 11 and support 12 are slidably mounted on frame 13. Manual actuation of the hand wheel 14 causes the position of the mount 9 to be regulated with respect to the tire tread through a suitable screw and follow 15 so that the cutter 16 may be brought into and out of engagement with the tread. A spigot is provided so that a liquid may be directed upon the cutter during operation for lubrication and cooling of the cutter.

Referring to Figs. 4 through 8 of the drawings, the cutter 16 is continuous, extends in a substantially helical or spiral shape for over 360° and has a minimum diameter greater than the width of the tread. The cutter or blade 16 projects perpendicularly from the face of mount 9, with the intermediate portion 16b and trailing portion 16c bearing against a shoulder 17 which may be formed integrally with the base 9, or as an individual part suitably secured to the base 9. The shoulder 17 decreases in width throughout its circumference so as to provide a substantially helical surface to which the cutter 16 is secured by screws 18. A spacer member 19 of equal width throughout its length is positioned between the overlapping portions 16a and 16c of the cutter 16, and, as shown in Fig. 8, the spacer 19 and the parallel portions 16a and 16c of the cutter are secured by screws 20 to the shoulder 17. The leading edge, or cutting portion, 16a is positioned a substantial distance from the center of the mount 9. The distance of the intermediate portion 16b of the cutter from the center of the mount 9 gradually decreases so that the trailing edge of the cutter 16c is positioned a lesser distance from the center of mount 9 than the edge 16A, the distance between edges 16A and 16C being equal to the distance between the slits formed by the cutting edge 16a. Preferably, as shown in the drawings, the leading edge, or cutting portion 16a, gradually increases in height throughout the length of portion 16a to a distance above shoulder 17 equal to the depth of the groove to be cut. However, good results may be obtained if the cutting portion 16a has a height equal to portion 16c and a sharpened extreme lateral edge.

In operation, the tire to be slit is inflated and mounted upon a conventional wheel which is secured to the shaft 2. The motor 11 is energized causing rotation of the helical knife and the hand wheel 14 is actuated so as to bring the cutter into engagement with the tread of the tire, as shown in Fig. 3. The leading edge of the cutter 16a enters and slits the tire tread. The intermediate portion 16b of the cutter 16 follows through the slit for approximately 270° of arc at which time the slit is displaced a distance equal to the width of spacer 19. Otherwise stated, the portion 16b imparts an increment of rotation to the tire, equal to the distance between leading edge 16a and the trailing edge 16c. At that time the leading edge 16a is again in position to begin a new slit. While the new slit is being formed, the trailing edge 16c remains in the preceding slit to prevent the tire from rotating. When the new slit is cut the shaft 10 will have rotated approximately 90° and the trailing edge 16c will disengage from the preceding slit so that the intermediate portion 16b may follow through the new slit and displace it in the manner previously described.

As shown in Figs. 9, 10 and 11 various configurations of slits may be imparted to tire treads by this invention. For example, slits may be cut with a cutter having a diameter only slightly greater than the width of the tread, so that slits are formed with relatively small radii of curvature, as shown in Fig. 9. The tire may be slit in a reverse direction so that superimposed arcuate slits extend in opposite directions as shown in Fig. 10. Then too, the diameter of the cutter 16 may be increased so that relatively large arcuate slits are formed approaching straight line transverse slits, as shown in Fig. 11.

Fig. 12 of the drawing shows a modification of this invention wherein a plurality of cutters 21, 22 and 23 are supported upon a mount 24 having a diameter much greater than the width of the tread. The leading edges 21a, 22a and 23a overlap and are parallel to the trailing edges 23b, 21b and 22b respectively for a distance at least equal to a substantial portion of the length of the cutters. Each trailing edge is secured to the mount 24 at a distance from the center thereof less than the leading edges. It is evident that one rotation of the mount shown in Fig. 12 will impart three slits to the tire tread because, as the leading edge of any of the cutters 21 through 23 begins a new cut the cutter will follow through the new slit and displace the slit a distance equal to the distance between the respective overlapping trailing and leading edges of the cutters before the next succeeding leading edge begins a new cut.

Figure 1:
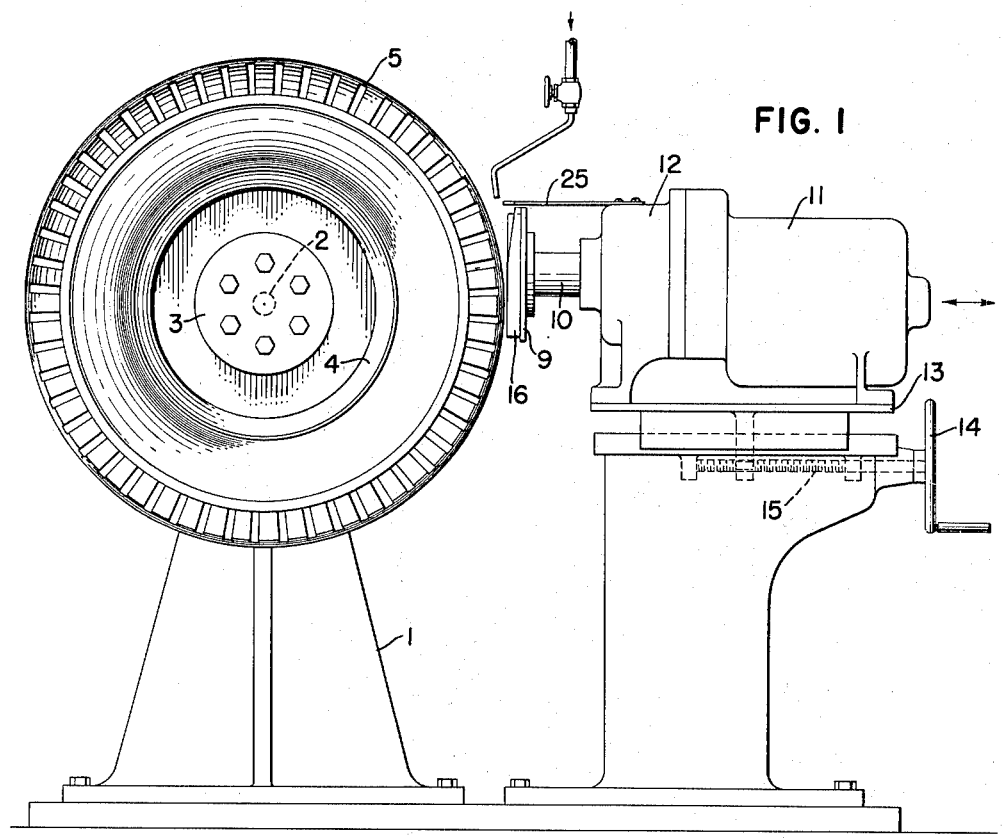
Fig. 1 is a front elevational view of the apparatus embodying this invention.
Figure 2:
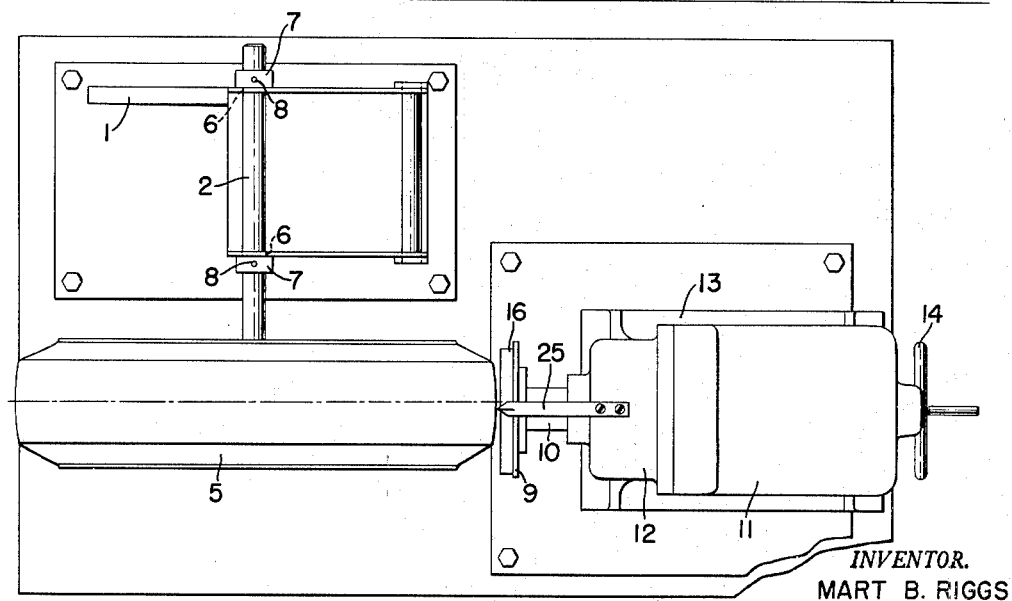
Fig. 2 is a plan view of the slitting machine shown in Fig. 1.

During passage of the cutter 16 through the tread, the carcass and tread tend to stretch or yield in the direction of movement of the cutter which causes the centers of the arcuate slits to be displaced from the center of the tread. Accordingly, a pointer 25 having a suitable mark for indicating the vertical diameter of the mount 9 is provided to which reference may be made to offset the center plane of the tire from the vertical diameter of mount 9 a distance approximately equal to the yield. Set screws 8 are loosened and set rings 7 adjusted so that the tire is offset in a direction opposite to the direction of movement of the cutter through the tread, as shown in Fig. 2. The tread will thereby be displaced during the cutting operation in a direction toward the vertical diameter of the cutter 9 so that the centers of the arcuate slits are coincident with the center of the tread.

The slits cut by the apparatus of the invention described herein extend into the tread at an angle to the tread radius passing through the slit being cut, as shown in Fig. 3. It is to be understood that the axis of the cutter shaft 10 may be offset in the plane of the tire so that it is parallel to the radius of the tire passing through the slit being cut. The slits will then be cut parallel to, rather than at an angle, to the radius passing through each slit.

While certain representative embodiments and details have been shown for the purpose of illustrating the invention, it will be apparent to those skilled in this art that various changes and modifications may be made therein without departing from the spirit or scope of the invention.

I claim:

1. An apparatus for transversely cutting the treads of tires to form transverse slits having a length substantially greater than the spacing between said slits comprising in combination means for supporting a tire for free rotation, a carriage rotatable in a plane adjacent the tread surface of the tire, said carriage having an axis of rotation substantially normal to said plane, means for driving the carriage, said carriage having at least one blade axially projecting from said carriage and engaging the tread surface of said tire, said blade being helically disposed relative to the axis of rotation of said carriage, said blade having leading and trailing edges of a length at least equal to a substantial portion of the length of the said blade and an intervening intermediate edge portion, said trailing edge being parallel to and overlapping said leading edge throughout substantially the entire length of said leading edge whereby the spacing of the slits is maintained at least equal to the spacing between the parallel overlapping leading and trailing edges of said blade.

2. An apparatus as claimed in claim 1 in which the trailing edge and intermediate portion of said blade project axially from said carriage a constant distance no greater than the maximum axial projection of said leading edge.

3. An apparatus for cutting the treads of tires as claimed in claim 1 having a member of constant width removably secured and interposed between said leading and trailing edges of said blade.

4. An apparatus for slitting the treads of tires as claimed in claim 1 having means secured to said carriage and disposed adjacent to said blade for positively limiting the depth of cut.

5. An apparatus for transversely cutting the treads of tires to form slits having a length substantially greater than the spacing between said slits comprising in combination means for supporting a tire for free rotation, a carriage rotatable in a plane adjacent the tread surface of the tire, said carriage having an axis of rotation substantially normal to said plane, means for driving the carriage, said carriage having a plurality of blades axially projecting from said carriage and engaging the tread surface of the tire, each of said blades disposed in a helical direction relative to the axis of rotation of said carriage, each of said blades having leading and trailing edges of a length at least equal to a substantial portion of the length of said blades and an intervening intermediate portion, the trailing edge of each blade being parallel to and overlapping the leading edge of the adjacent blade throughout substantially the entire length of said trailing edges whereby the spacing of the slits is maintained at least equal to the spacing between the parallel overlapping leading and trailing edges.

6. An apparatus for slitting the treads of tires as claimed in claim 5 in which the trailing edge and intermediate portion of each blade project axially from said mount a constant distance no greater than the maximum projection of said leading edge.

7. An apparatus for slitting the treads of tires as claimed in claim 5 having a member of constant width removably secured to and interposed between the leading edge of each blade and the trailing edge of the adjacent blade.

References Cited in the file of this patent

UNITED STATES PATENTS

| | | |
|---|---|---|
| 1,280,753 | Juengst | Oct. 8, 1918 |
| 2,133,438 | Eger | Oct. 18, 1938 |
| 2,575,450 | Huff | Nov. 20, 1951 |
| 2,664,160 | Speakman | Dec. 29, 1953 |